United States Patent [19]
Arenhold

[11] 3,953,053
[45] Apr. 27, 1976

[54] MUD FLAPS FOR AUTOMOBILE FENDERS
[76] Inventor: Knut Arenhold, 5, Birkenweg, Kehl-am-Rhine, Germany
[22] Filed: May 2, 1975
[21] Appl. No.: 573,832

Related U.S. Application Data
[63] Continuation of Ser. No. 427,249, Dec. 21, 1973, abandoned.

[30] Foreign Application Priority Data
Dec. 21, 1972  France .............................. 72.47084
Oct. 19, 1973  Germany ............................ 2352472

[52] U.S. Cl. ........................................ 280/154.5 R
[51] Int. Cl.² ........................................ B62D 25/16
[58] Field of Search ............ 280/154.5 R, 152, 153, 280/154

[56] References Cited
UNITED STATES PATENTS
1,904,342  4/1933  Zaiger .......................... 280/154.5 R
2,084,087  6/1937  Jackson ........................ 280/154.5 R
2,865,654  12/1958  Compte ........................ 280/154.5 R FOREIGN PATENTS OR APPLICATIONS
1,962,863  6/1971  Germany ...................... 280/154.5 R
1,399,219  6/1964  France ......................... 280/154.5 R Primary Examiner—Robert R. Song
Attorney, Agent, or Firm—Robert E. Burns; Emmanuel J. Lobato; Bruce L. Adams

[57] ABSTRACT

A mud flap for a fender of a vehicle having a web integral with an upwardly extending projection for securing the mud flap to a fender. A reinforcing metallic element is provided on the projection for mounting the mud flap on the fender so that it depends therefrom vertically regardless of the curvature of the fender. The reinforcing element is bent relative to the plane of the mud flap to position the mud flap on the fender so that it depends vertically. The reinforcing element or a pair of jaws or clamps may be used to secure the mud flap to a fender or car body.

9 Claims, 6 Drawing Figures

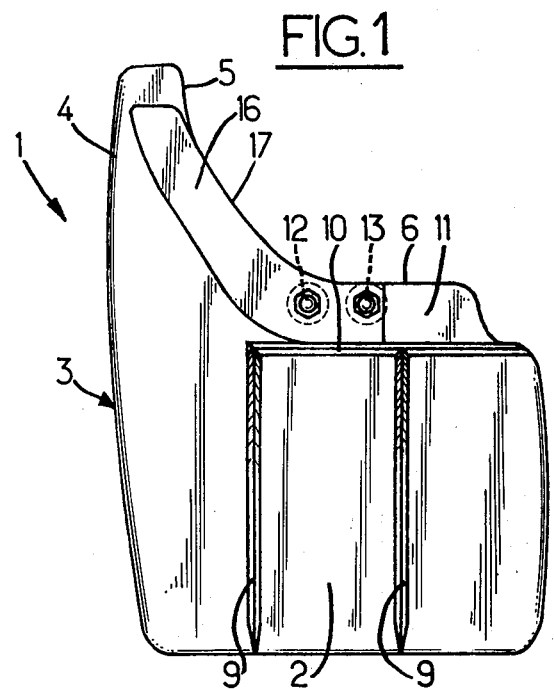
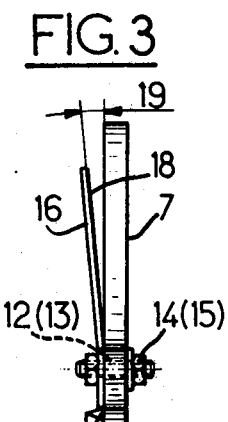
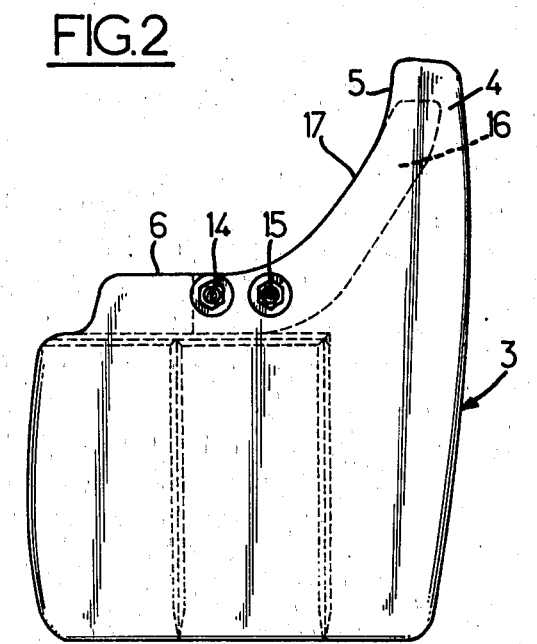

MUD FLAPS FOR AUTOMOBILE FENDERS

This is a continuation of application Ser. No. 427,249 filed Dec. 12, 1973.

BACKGROUND OF THE INVENTION

The present invention relates to a mud flap for vehicle fenders, and particularly the rear fenders of an automobile.

In order to limit the splattering of water or the gathering of spattered dirt and mud on the rear of a car and to avoid the projecting of gravel, stones and other solids, mud flaps which extend towards the bottom of the rear mudguards or fenders are fastened on the rear fenders of the car. In order to withstand the force of the air during travel of the vehicle and in order to take up the impacts produced by solids ejected under the wheels, it is necessary for the flap to have a certain rigidity and to be firmly fastened to the intended securing positions.

The flap is maintained firmly fastened to the mudguard or fender by means of fastening devices adapted to each type of car. Due to the fact that the mud flaps are made of flexible material, such as rubber, two points of attachment must be provided. This makes the putting in place of the flaps rather complicated and relatively expensive. Therefore, both the manufacturer and the retailer are forced to provide a very wide range of fastening means, which increases the cost.

SUMMARY OF THE INVENTION

An object of the present invention is to overcome these drawbacks and it proposes providing a mud flap which requires only a single point of attachment and can be fastened to practically all automobiles, which makes it possible to reduce the cost and to simplify the installation thereof.

The present invention relates to a mud flap of flexible material provided with a web and a fastening flange or projection which extends upwardly from the web so as to fasten the flap to the edge of the body in such a manner that the upper edge of the web snugly fits the inner edge of the curved or straight fastening flange of the fender, which is generally directed from the inside towards the outside. The invention relates as well to fastening means for clamping or securing the flap on the body or the mudguard or fender. A reinforcement element is provided at the location of the upper edge of the web of the flap and the inner edge of the fastening flange. An upper edge of the reinforcing element extends along the upper edge of the web of the flap and the inner edge of the fastening flange or projection.

Such a flap fits any type of mudguard or fender of any passenger car. The region having the reinforcing element is applied against an inwardly turned rim of the mudguard or of the body at the location of each wheel. This rim and the reinforcing element as well as jaws which clamp, for instance, the fastening flange hold the flap firmly in place. This result can also be obtained by means of bolts screwed in the rim and passing through the reinforcing element and the flap itself.

This embodiment of the flap leads primarily to a form of flap provided with a reinforcing element which can be fastened together by means of simple fastening means. This fastening is furthermore effected in a single region of the flap, while the flaps known at the present time must be fastened at at least two points spaced apart from each other in order for the fastening to be sufficiently dependable and rigid.

Aside from the vehicles described above which are provided with a rim on the mudguard or the body located at the location of each wheel and directed towards the inside, there are a small number of types of vehicle such as the Renault R5 which do not have such a rim. The flap can therefore no longer be fastened to the body or to the mudguard by the region provided with a reinforcing element, by means of clamping jaws or a bolt passing through said reinforcing element and the flap.

In accordance with another object of the present invention, the flap can also be fitted to vehicles whose body or mudguard is without an inward directed rim at the location of the wheel and to which the attachment would not otherwise be possible.

Such a flap is characterized by the fastening means in the region of the reinforcing element being formed of jaws which can be fastened onto said element or onto the surface of the flap which is opposite it. The surfaces of the jaws are directed substantially perpendicular to the plane of the flap.

The jaws of the flap therefore no longer clamp an inwardly directed rim, as in the case of vehicles provided with such a rim at each wheel, as well as the respective region of the flap. But rather the surface of the jaws is directed perpendicular with respect to the flap, that is to say, they can no longer extend along the edge of an inward directed rim at the place of the wheel, generally perpendicular to the axis of the wheel, and they are fastened directly so as to be held in the correct position.

The fastening is effected in this case also in a single zone without requiring two points of attachment which are spaced apart. The resistance imparted to the flap by the reinforcing element is sufficient without reducing the elasticity of the flap.

In accordance with a preferred embodiment of the invention, the jaws which are of U-shape cross section rest at their base surfaces against the reinforcing element or against the surface of the flap, and they are furthermore each provided with a screw which passes through one leg of the jaw and the front surface of which together with a facing surface of the other leg forms the clamping surfaces.

The U-shaped jaws may serve both for fastening the flap to an inward directed rim or for fastening it to a body of a fender or mudguard without rim, so that a single type of jaw can be used, whatever the type of vehicle, which leads to a substantial reduction in the cost of manufacture and to simple mounting.

The jaws may advantageously be fastened by means of screws passing through the reinforcing element. For the engagement of these screws, holes can be provided in the reinforcing element upon the manufacture of the latter. These holes are in fact unnecessary if the flap is fastened on a body or a mudguard provided with a rim, but being already present if the attachment must be effected to an edge of a body of fender or mudguard not having a rim. The user need merely fasten the jaws solely be means of the screws engaged in the holes previously drilled in the reinforcing element, these screws also assuring a corresponding alignment of the jaws to fit the profile of the fastening edge.

For this purpose, the invention concerns a flap for an automobile fender or the like comprising a flap proper of flexible material provided with a web and a fastening flange extending upward from the web, in order to fasten the flap to the edge of the body so that the upper edge of said web fits the inner edge of the curved or straight fastening flange which is generally directed from the inside towards the outside, as well as fastening means for clamping or screwing the flap onto the body or mudguard, characterized by the fact that it comprises, on at least one of its faces, a reinforcing element and particularly a metal element provided at the place of the upper edge of the web of the flap and the inner edge of the fastening flange. The upper edge of the reinforcing element extends along the upper edge of the web of the flap and the inner edge of the fastening flange. The reinforcing element may have imparted thereto a certain angle in order on the one hand to impart to the flap an almost vertical position, whatever the radius of curvature of the mudguard, and on the other hand to hold the flap in a plane perpendicular to the axis of the vehicle during its travel. Fastening means, in the region of the reinforcing element, are formed of jaws which can be fastened to the latter or to the surface of the flap which is opposite it. The clamping surfaces of these jaws are disposed substantially perpendicular to the plane of the flap.

BRIEF DESCRIPTION OF THE DRAWINGS

The invention will be clearly understood from the following description, given by way of illustration and not of limitation, and read with reference to the accompanying drawing in which:

FIG. 1 is an elevation view of the front face of a flap, according to the invention, viewed in the direction of travel of the automobile on which the flap is mounted.

FIG. 2 is an elevation view of the rear face of the same flap, also seen in the direction of travel of the automobile.

FIG. 3 is a profile view of the flap.

Referring to FIGS. 1 to 3 the automobile fender flap 1 comprises a flap web portion 2 of a flexible material such as rubber, the shape of which is substantially that shown in the figures of the drawing. The web portion 2 has a side edge 3 which is extended by a projection or flange portion 4. This flange portion 4 has a top and side edge 5, opposite edge 3, which is connected by a large radius of curvature with the upper edge 6 of the web portion 2 thus presenting an elongate outline 5, 6 conformable to an edge portion of the fender to which the flap is to be secured. One of the faces 7 of the flap 1 is smooth, while the second face 8 has stiffening ribs 9, 10. In the drawings, vertical ribs 9 and horizontal ribs 10 have been shown, although of course the ribs may be diagonal or be of any inclination.

Figure 4:
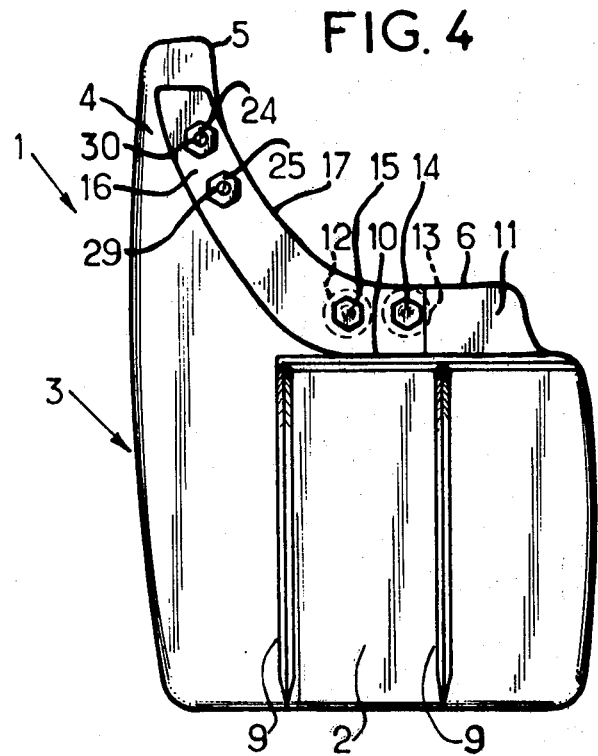
FIG. 4 is an elevation view of one face of a second embodiment of a flap in accordance with the invention.

In an upper edge portion 11 of the flap 1, where edge 6 of web portion 2 approaches or merges with edge 5 of flange portion 4, there are provided holes 12, 13 through which fastening elements 14, 15 are engaged which make it possible to fasten a counter-flange or reinforcing element 16 onto the face 8 which is provided with the ribs 9 and 10. In accordance with another embodiment, not shown, the reinforcing element 16 can be embedded in the web 2 of the flap 1. The edge 17 of this element 16 fits, snugly, the upper edge 6 of the web 2 as well as the radius of curvature of side edge 5. In this way the shape of the reinforcing element 16 is close to the shape of the flange 4. Upon the fastening of the flap 1 to the mudguard of the automobile (not shown), the upper portion 18 of the reinforcing element is applied against the face 8 of the flap 1 imparting a substantially vertical position to the web portion 2.

If, due to the curvature of the mudguard, the flange portion 4 of the flap 1 secured to the mudguard or fender, is not vertical, the reinforcing element 16 can be bent from its normal, flat, vertical shape by a given angle 19 and, upon the fastening of the flap 1, the flange 4 comes against the bent element 16. As a result, the flap 1 is also bent. Its upper portion snugly fits the curved shape of the mudguard, while the lower portion occupies the desired practically vertical position.

Figure 6:
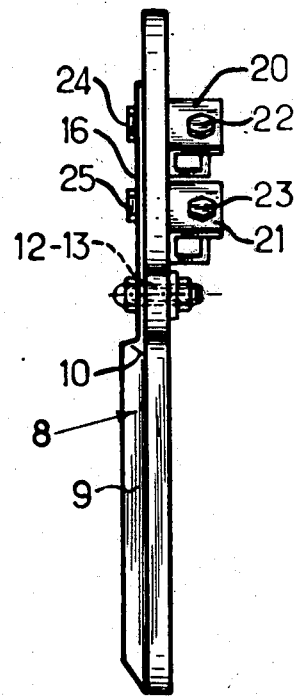
FIG. 6 is a profile view of the flap in FIG. 4.
Figure 5:
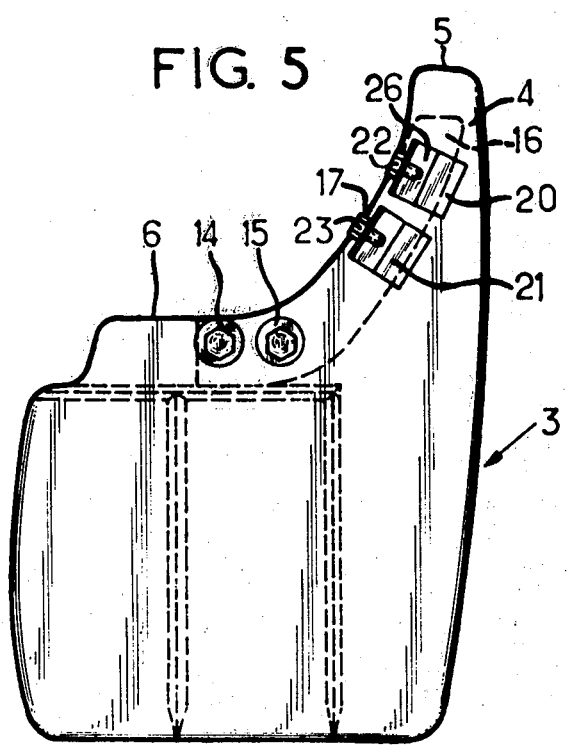
FIG. 5 is an elevation view of the other face of the flap, in FIG. 4, to which the jaws are fastened.

Let us refer now to FIGS. 4 to 6 illustrating a second embodiment in which corresponding parts with those of the first embodiment have corresponding reference numerals. Jaws 20, 21 of U-shape cross section are fastened, at their bases, to the surface of flange portion 4 of the flap opposite the face 8 against which the reinforcing element 16 is fastened. Bolts 29, 30 pass, for this purpose, through the bases of the jaws, the reinforcing element 16 and the flange 4, and they are tightened by nuts 24, 25.

The U-shaped jaws 20 and 21 are also provided with tightening screws 22, 23 passing through one of their arms, the end of each screw facing an inwardly bent edge of the other arm. Any edge portion of a car body perpendicular to the surface of the flap may therefore be introduced into the opening provided between the arms of the jaws 20, 21 (indicated in particular by 26 in FIG. 5) and gripped by tightening the screws 22, 23. The ends of the screws serving as clamping surfaces and the edges of the other arms of the U-shaped jaws 20, 21 which are bent towards the inside, placed opposite to constitute an opposite jaw, are directed or positioned perpendicular to the upper surface of the flap.

It is thus possible to fasten the flap and the reinforcing element 16 which is rigidly connected with it to an edge portion of a car fender body or mudguard regardless of whether this edge portion is or is not provided with a rim. It is possible in this case as well as in that of the flap in accordance with the first embodiment to fasten the flap over a narrow region. It is not necessary to provide fastener at two points widely spaced apart to provide the reinforcing element 16 with sufficient stability at the upper portion of the mud flap, thereby decreasing its elasticity.

The manufacture of the flap and the mounting thereof are simplified if the reinforcing element 16 before being fastened to the flap by the bolts 14, 15 is provided with holes by means of which the jaws 20, 21 can be subsequently fastened. If the flap is used on vehicles provided with inwardly directed rims which permit fastening by jaws which grip the rim, the reinforcing element and the flap, the holes in question remain unused. However, they are available if the mounting is effected on an edge without any rim, and if necessary U-shaped jaws 20, 21 which permit such a mounting can be mounted there. The result is that the same type of flap can be used practically for any type of passenger car, regardless of whether the mounting is to be effected on an inward directed rim or on an edge without rim.

The jaws 20, 21 can particularly serve for mounting of the flap on an inwardly directed rim. The only further means required in this case additional to the means 16 for fastening the flap on a rimless edge, are the bolts 29, 30 and the nuts 24, 25. Since these parts are of very low cost, the flap can be delivered with the reinforcing element 16, the jaws 20, 21, the bolts 29, 30 with the nuts 24, 25, so as to be capable of use practically on any type of passenger car, even though possibly the bolts 29, 30 and the nuts 24, 25, as well as corresponding washers, are superfluous.

What I claim and desire to secure by Letters Patent is:

1. A mud flap for a fender of a vehicle, comprising:
   a flange portion having an elongate outline generally conformable to an edge area of a vehicle's fender;
   a web portion integral with said flange portion; both of said portions having two surfaces generally parallel to one another;
   a counter-flange secured to one of said portions and extending along an edge of one of said surfaces, defining an angle between the flange portion and the counter-flange, when not held to a fender, to match an inclination of the edge area of the fender from a vertical surface, for holding said portions to the fender and for keeping the web portion approximately vertical not-withstanding such inclination of the edge area; and
   fastening means secured to one of said portions and to the counter-flange for enabling said portions and said counter-flange to be secured to the edge area of the fender.

2. A mud flap according to claim 1 in which said fastening means comprise bolt means for connecting the counter-flange to one of said portions to clamp both portions, by the counter-flange, to the edge area of the fender.

3. A mud flap according to claim 2 in which said fastening means comprise bolt means extending through one of said portions and the counter-flange.

4. A mud flap according to claim 3 wherein said bolt means comprise a pair of bolts adjacent one another.

5. A mud flap for a fender of a vehicle, comprising;
   a flange portion having an elongate outline generally conformable to an edge portion of a vehicle's fender; a web portion depending from said flange portion; said portions having two surfaces generally parallel to one another;
   counter-flange means secured to said flange portion and extending along said elongate outline thereof, adjacent one of said surfaces of said flange portion, defining an angle between the flange portion and the counter-flange means, when not held to a fender, to match an inclination of the edge portion of the fender from a vertical surface for holding the flange portion to the fender and for keeping the depending web portion approximately vertical notwithstanding such inclination of the edge portion and of the flange portion secured thereto; and
   fastening means secured to the other surface of said flange portion for enabling said flange portion to be secured to a rim on the fender edge portion, comprising at least one pair of jaws extending from and transversely of said other surface, and means for engaging said jaws with the rim on the fender edge portion; whereby said web portion can be readily firmly secured to vehicle fenders with and without a rim, to intercept ejected mud and the like during travel of the vehicle.

6. A mud flap according to claim 5 including connecting fastener means approximately equally spaced from ends of said elongate counter-flange means for connecting the counter-flange means to said flange portion and for clamping a fender edge portion therebetween.

7. A mud flap according to claim 6 in which said connecting fastener means includes bolt means extending through the flange portion and the counter-flange means.

8. A mud flap according to claim 7 wherein said bolt means comprises a pair of bolts adjacent one another.

9. A mud flap according to claim 5 in which said fastening means includes base means defining a U-shaped cross-section with said jaws, and screw means threaded into one of the jaws for clamping a rim on said fender edge portion to the other jaw.

* * * * *